(12) United States Patent
Moore (10) Patent No.: US 9,571,691 B2
(45) Date of Patent: Feb. 14, 2017

(54) IMAGER ARRAY APPARATUS AND SYSTEMS

(75) Inventor: Steven R. Moore, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 952 days.

(21) Appl. No.: 13/458,127

(22) Filed: Apr. 27, 2012

(65) Prior Publication Data

US 2013/0286368 A1    Oct. 31, 2013

(51) Int. Cl.
*B41F 1/18* (2006.01)
*H04N 1/06* (2006.01)

(52) U.S. Cl.
CPC .... *H04N 1/0664* (2013.01); *H04N 2201/0082* (2013.01); *H04N 2201/0446* (2013.01)

(58) Field of Classification Search
CPC ...... B41F 33/0054; B41M 1/00; B41M 1/025; B41M 1/06; B41M 5/0256; B41N 3/08; B23K 26/0608; B41C 1/05; B41C 1/1091; B41C 1/145; H04N 1/0664; H04N 2201/0446
See application file for complete search history.

(56) References Cited

U.S. PATENT DOCUMENTS

| | | | | |
|---|---|---|---|---|
| 5,004,310 A | * | 4/1991 | McCracken | G02B 27/0018 359/217.1 |
| 5,391,856 A | * | 2/1995 | Minamida et al. | 219/121.68 |
| 2004/0156414 A1 | * | 8/2004 | Govorkov | 372/55 |
| 2005/0103998 A1 | * | 5/2005 | Talwar et al. | 250/340 |
| 2005/0189329 A1 | * | 9/2005 | Talwar et al. | 219/121.65 |
| 2006/0268241 A1 | * | 11/2006 | Watson et al. | 353/94 |
| 2009/0057268 A1 | * | 3/2009 | Aviel | 216/65 |
| 2011/0228243 A1 | * | 9/2011 | Banine | B82Y 10/00 355/55 |

* cited by examiner

*Primary Examiner* — Matthew G Marini
(74) *Attorney, Agent, or Firm* — Ronald E. Prass, Jr.; Prass LLP (57) ABSTRACT

An imager apparatus useful for a digital architecture lithographic printing system includes a first imager bank having at least one imager configured to produce a first output beam; and a second imager bank having at least one imager configured to produce a second output beam, the second imager bank being located at a first angle with respect to the first imager bank, the first output beam and the second output beam being separated by a second angle which is less than the first angle.

20 Claims, 6 Drawing Sheets

IMAGER ARRAY APPARATUS AND SYSTEMS

FIELD OF DISCLOSURE

The disclosure relates to digital architecture printing systems for printing with lithographic ink. In particular, the disclosure relates to imaging systems composed of multiple imagers.

BACKGROUND

A digital offset or digital architecture printing system may be used for printing with lithographic inks. Digital offset printing processes may include applying fountain solution to a surface of an imaging plate. The imaging plate may be arranged on an outer portion of an imaging cylinder. The imaging cylinder may be rotatable for bringing regions of the imaging plate surface to pass adjacent subsystems, including: a dampener for applying fountain solution; an imaging system for imaging or image-wise vaporization of fountain solution from select regions of the imaging plate; an inker for applying ink to the imaging plate surface; a transfer station from which an ink image is transferred to a printable medium; and a cleaner for removing residue from a surface of the image plate and preparing the surface to begin the process anew. After applying the fountain solution, an imaging system composed of a high power laser may be used to image-wise vaporize fountain solution from select regions of the surface. Light energy is absorbed by the imaging plate, which may comprise silicone, to locally heat and boil off fountain solution from the plate surface. The laser may be used to for vaporizing the fountain solution at select surface regions in accordance with digital image data. Ink may be applied by the inker, and may be deposited on regions where fountain solution has been vaporized from the imaging plate. Conversely, ink may be rejected by regions of the imaging plate surface where fountain solution remains. A resulting image is transferred at the transfer station to paper or other suitable media by way of pressure.

For the imaging step, an imaging system may be used that is configured to produce an output beam that spans the operative width of an imaging plate surface. Due to the high output power requirement, it is difficult to construct a suitable imaging system from a monolithic imager. It is much more feasible and economical to construct the imaging system from an array of imagers, each possessing a beam width that is smaller than the imaging plate operative width. To construct the imaging system, multiple imagers may be configured to "stitch" together a beam having a useful process width One problem with construction of the imager array is that the physical width of each imager may be greater than its output beam width, hence a simple linear array of imagers that are 'butted' to each other will result in an output beam having periodic gaps. An alternative imaging system construction can utilize two arrays (or 'banks') of butted imagers that are offset along the beam axis so that the composite output beam has no periodic gaps. The banks can further be oriented angularly so that all imager beams converge along a common line on the imaging plate surface. Such an imaging system construction has been found to be feasible and economical. However, this imaging system is prone to image distortion if the surface of the imaging plate is not at the exact point at which the beams from the multiple beams are converging. An imaging system having the advantages of the multiple converging bank configuration but without the sensitivity to image plate location is desired.

SUMMARY

An imager system used for an imaging step in digital lithographic printing is desired that produces high fidelity images irrespective of image plate location for imaging systems having multiple converging banks of imager arrays. Apparatus and systems are provided that reduce or eliminate process direction error in imager system output beam placement.

In an embodiment, apparatus useful for digital architecture and lithographic printing systems may include a first imager bank having at least one imager configured to produce a first output beam; and a second imager bank having at least one imager configured to produce a second output beam, the first output beam and the second output beam being substantially parallel or converging at an angle which is substantially less than the included angle which separates the first and second imager banks. The first imager bank may be configured to apply the first beam to an imaging plate. A second imager bank may be configured to apply the second beam to the imaging plate, wherein the first beam and the second beam are substantially parallel at the imaging plate. In an embodiment, the second beam and the first beam each have a cross-process width of greater than 20 mm. In an embodiment, the first imager bank may be configured to apply the first beam to an imaging plate, and the second imager bank may be configured to apply the second beam to the imaging plate, wherein the first beam and the second beam extend along converging lines at a first angle to a first point, and extend along separate parallel lines at a second point, the second point interposing the first point and the imaging plate. In an embodiment, apparatus may include the first imager bank being configured to apply the first beam to an imaging plate, and the second imager bank being configured to apply the second beam to the imaging plate, wherein the first beam and the second beam extend along converging lines at a first angle to a first point, then extend from the first point along separate converging lines at a second angle to the imaging plate, where the second angle between the first beam and the second beam is substantially less than the first angle.

In an embodiment, apparatus may include a wedge mirror, the wedge mirror being configured to redirect at least one of the first beams towards the imaging plate and the second beam toward the imaging plate, the wedge mirror being disposed at the first point. In an embodiment, a first angle between the first beam and the second beam, between the first point and the first imager bank is greater than a second angle between the first beam and the second beam extending from the first point to the imaging plate.

In an embodiment, systems for digital architecture lithographic printing may include an imaging member having an imaging plate; a first imager bank having at least one imager configured to produce the first output beam; and a second imager bank having at least one imager configured to produce a second output beam, the first output beam and the second output beam being substantially parallel or converging at an angle which is substantially less than the included angle which separates the first and second imager banks. The first imager bank may be configured to apply the first beam to the imaging plate. The second imager bank may be configured to apply the second beam to the imaging plate. The first beam and the second beam may be substantially parallel at the imaging plate. The second beam and the first beam may have a cross-process width of greater than 20 mm.

In an embodiment, the first imager bank may be configured to apply the first beam to the imaging plate. The second imager bank may be configured to apply the second beam to the imaging plate. The first beam and second beam may extend along converging lines at a first angle to a first point, and extend along separate parallel lines at a second point, the second point interposing the first point and the imaging plate. In an embodiment, systems may include the first imager bank being configured to apply the first beam to the imaging plate and the second imager bank being configured to apply the second beam to the imaging plate, wherein the first beam and the second beam extend along converging lines at a first angle to a first point and extend from the first point along separate converging lines at a second angle to the imaging plate, where the second angle between the first beam and the second beam is substantially less than the first angle.

In an embodiment, systems may include a wedge mirror, the wedge mirror being configured to redirect at least one of the first beam and the second beam towards the imaging plate, the wedge mirror being disposed at the first point. In an embodiment, systems may include the first beam and the second beam arranged to produce a first beam and a second beam that extend along converging lines at a first angle. Between the first point and the imager bank, the first angle is greater than a second angle between the first beam and the second beam extending from the first point to the imaging plate along respective converging lines.

In an embodiment, systems may include a first bank having a plurality of imagers being configured to output a first set of parallel beams. Systems may include a second bank having a plurality of imagers being configured to output a second set of parallel beams. The first bank and the second bank may be configured so that the first set of parallel beams and the second set of parallel beams form a scanning line image on an imaging plate. In an embodiment, systems may include at least one imager being a high power infrared laser line generator.

Exemplary embodiments are described herein. It is envisioned, however, that any system that incorporates features of apparatus and systems described herein are encompassed by the scope and spirit of the exemplary embodiments.

DETAILED DESCRIPTION

Exemplary embodiments are intended to cover all alternatives, modifications, and equivalents as may be included within the spirit and scope of the apparatus and systems as described herein.

Reference is made to the drawings to accommodate understanding of apparatus, systems, and methods for digital architecture printing using a multiple bank imager array configured for substantially parallel beam output. In the drawings, like reference numerals are used throughout to designate similar or identical elements. The drawings depict various embodiments related to embodiments of illustrative apparatus, and systems for digital architecture printing using lithographic inks.

Figure 1:
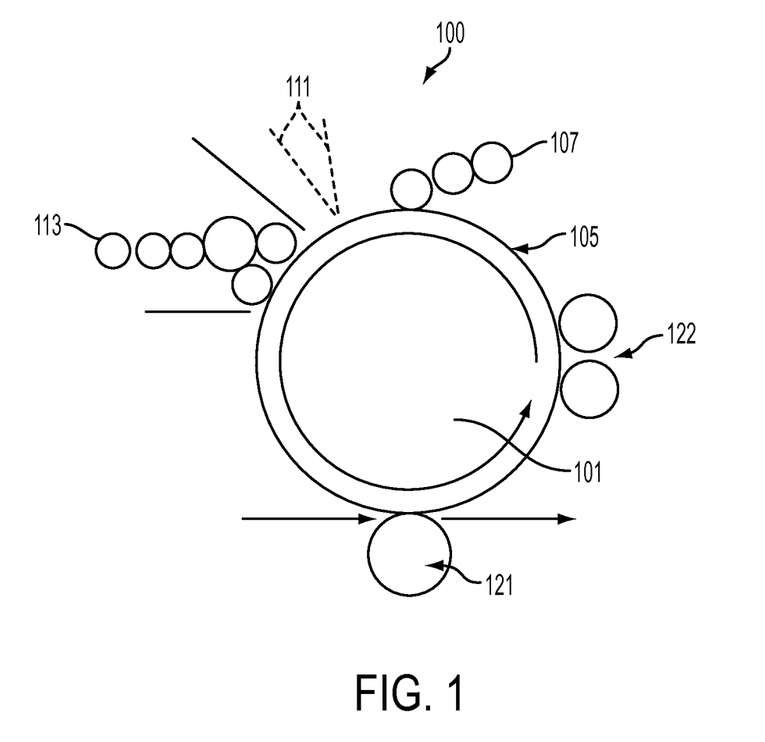
FIG. 1 shows a diagrammatical side view of a digital architecture printing system and processes.

A digital offset or digital architecture printing system may be used for printing with lithographic inks. FIG. 1 shows a digital offset or digital architecture printing system 100 for printing on media such as paper with lithographic ink. System 100 may include an imaging member such as cylinder 101. The imaging cylinder 101 may include an imaging plate 105 formed on an outer portion of the cylinder 101. The plate may be formed of either a natural or synthetic elastomer.

The imaging cylinder 101 may be rotatable for bringing regions of the imaging plate 105 surface to pass adjacent subsystems, including: a dampener or fountain solution or release agent management system 107 for applying fountain solution; an imager system 111 for image-wise vaporization of fountain solution from select regions of the imaging plate 105; an inker 113 for applying ink to the imaging plate 105 surface; a transfer station 121 from which an ink image is transferred to a printable medium such as paper; and a cleaner system 122 for removing residue from a surface of the imaging plate 105 and preparing the imaging plate 105 surface for beginning the process anew.

The imager system 111 for use in digital architecture printing systems for printing with lithographic ink may be configured to pattern a thin layer of fountain solution applied to an imaging plate 105. The imager 111 may include a line laser source, a micro-mirror modulator array, and projection optics. Light energy from the laser may be pixel-wise reflected off of the individual micro-mirrors, and then focused by the optics of the projection optics system onto the imaging plate 105. Light energy may be absorbed by the plate, which causes the fountain solution to locally heat and boil off. Preferred laser imagers may accommodate 1,200 dpi spot size. Due to constraints in commercially available micro-mirror array size and mirror pitch, a maximum cross-process width of a typical output beam is approximately 20 mm. Accordingly, a plurality of imagers is used to stitch together a process beam having a useful process width. Because a physical width of a typical imager is about 40 mm, imagers may not be simply butted immediately adjacent to one another and form a continuous composite beam. Accordingly, the plurality of imagers may be arranged in a multiple bank architecture: there may be two banks of imagers with the banks separated by a 20 degree included angle, for example. An output beam of each bank intersects or nearly intersects at a nominal image plane. In related art systems, any change in the location of the image plane where an imaging plate surface resides will cause the output beams from the two banks outputting the beams to separate in the process direction, and may cause image distortion. For example, a narrow line aligned along the cross-process axis would appear as a series of line segments that are slightly offset in the process direction. An image plane variation could be due to issues including cylinder run out, plate thickness variations, and thermal expansion.

Apparatus, systems, and methods provided reduce image distortion by, inter alia, including a wedge mirror, which may be two-sided, in the optical beam path of at least one imager bank. The wedge mirror may be configured to redirect by way of a first surface reflection, the output beams so they will emerge either parallel and slightly offset by the mirror thickness, or converging by a small angle that is less than the angle that separates the imager banks. A process direction error in pixel placement caused by variation in the imaging plane location is greatly reduced or eliminated.

Figure 2:
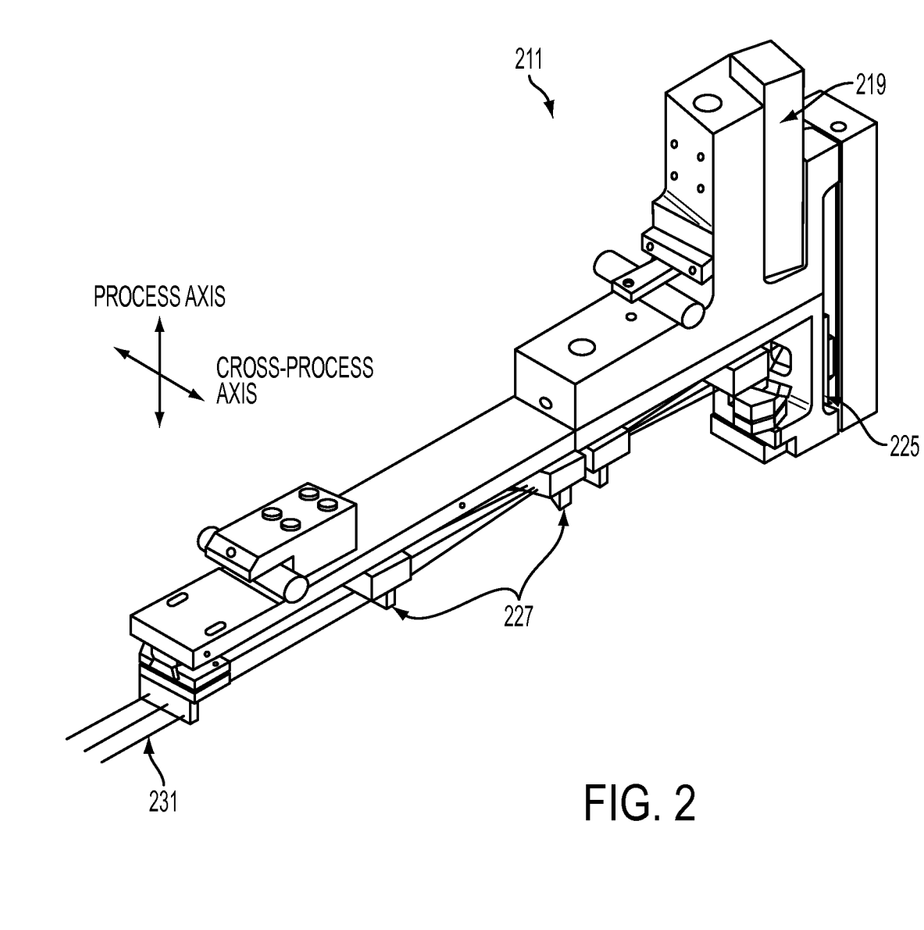
FIG. 2 shows a diagrammatical perspective view of an imager in accordance with an exemplary embodiment.

FIG. 2 shows a diagrammatical perspective view of an imager in accordance with an embodiment. In particular, FIG. 2 shows an imager 211 having a laser line generator 219. The laser line generator 219 may be a high power 980 nm infra red (IR) laser line generator, for example. The laser line generator 219 may be configured to output an output beam to be reflected onto a micro-mirror array. An exemplary micro-mirror array may be a Texas Instrument DMD micro-mirror array. FIG. 2 shows the location of a micro-mirror modular array 225. The laser line generator 219 may output an output beam onto the micro-mirror modulator array 225. The mirrors of the micro-mirror modulator array 225 may be individually actuated so that an incident laser beam is either reflected in a direction parallel to the projection optics axis (if the mirror is on) or reflected into a beam absorber (if the mirror is off). Accordingly, a pattern scan line may be generated at an image plane (not shown). With a laser output power of, for example 60 watts, sufficient light energy may be projected onto an imaging plate located at the image plane to heat the imaging plate above a boiling point of fountain solution applied to the imaging plate during the lithographic printing process. A useable scan line width and a cross-process direction of the imager 211 shown in FIG. 2 is about 20 mm, whereas a total mechanical envelope of an imager, including the laser housing, the DMD mounting circuit board, and the imager frame to which they mount, in a cross-process direction is about 40 mm.

As shown in FIG. 2, the beam output by the laser line generator 219 may be reflected onto the micro-mirror array 225 so that the incident laser beam is reflected in a direction parallel to and through projection optics system 227. Output beam 231 may be output from the projection optics system 227. The projection optics system 227 may be configured to focus light energy from a laser beam output by the laser line generator 219, which is pixel-wise reflected off the individual micro-mirrors of the micro-mirror modulator array 225 to produce the output beam 231. The output beam 231 may be focused onto an image plane at a surface of an imaging plate. Light energy absorbed by the plate may cause fountain solution to locally heat and boil off.

Figure 3:
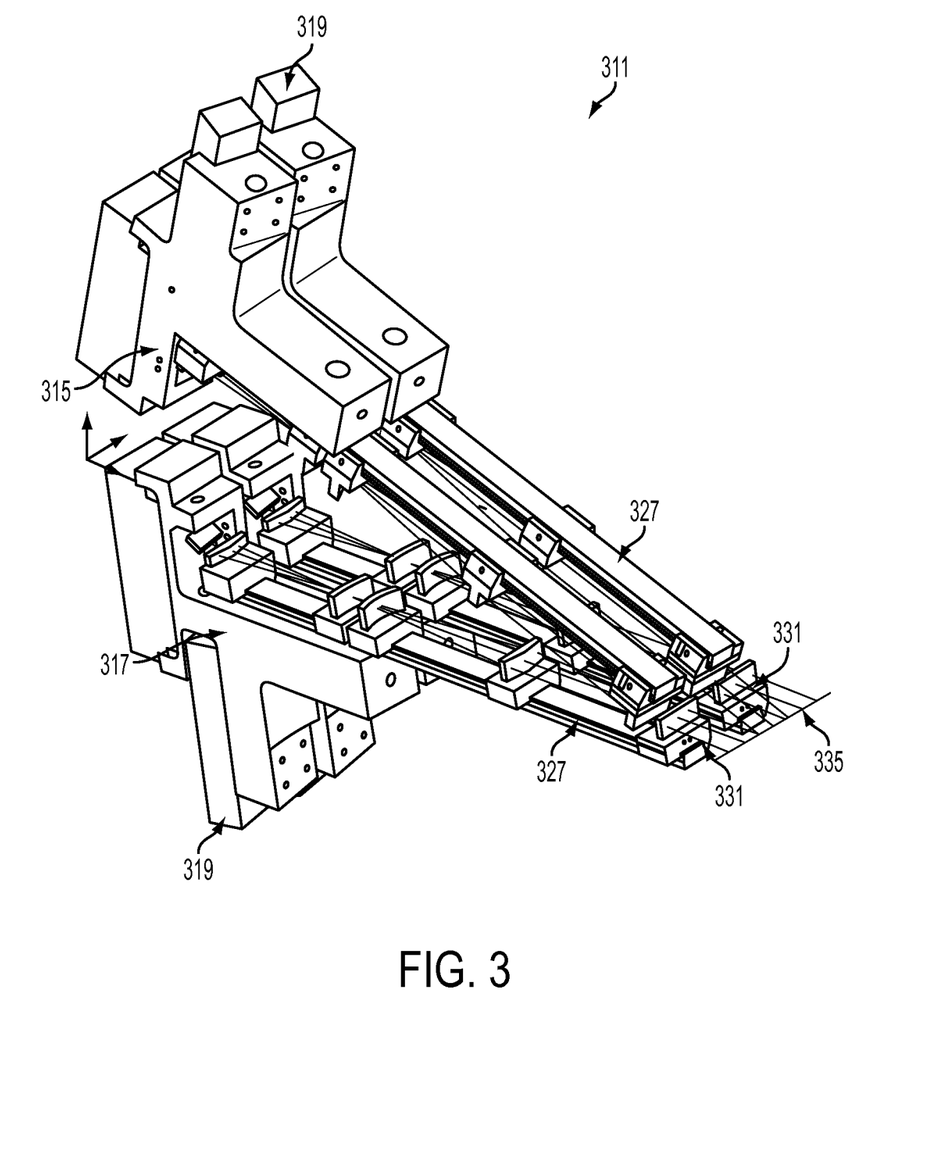
FIG. 3 shows a diagrammatical perspective view of an imager bank in accordance with an exemplary embodiment.

FIG. 3 shows an imager 311 in accordance with an embodiment. In particular, FIG. 3 shows an upper imager bank 315 and a lower imager bank 317. The upper imager bank 315 and the lower imager bank 317 may be configured to be arranged so that the lower imager bank 317 is disposed below the upper imager bank 315 at an angle that accommodates stitching together of beams output by each of the upper imager bank 315 and the lower imager bank 317. The upper imager bank 315 may comprise one or more imagers as shown in FIG. 2. The lower imager bank 317 may comprise one or more imagers as shown in FIG. 2. An upper imager bank 315 having a plurality of imagers may be arranged so that they are rotated and offset along the cross-process direction with respect to a plurality of imagers of a lower imager bank 317. Each imager within the upper image bank 315 and the lower imager bank 317 may include a laser line generator 319. The laser line generator may be configured to output a laser beam that is pixel-wise reflected off individual micro-mirrors of a micro-mirror array (not shown). Light energy that is pixel-wise reflected off the individual micro-mirrors of the micro-mirror array is focused by a projection optics system 327 onto an image plane at a surface of an imaging plate.

As shown in FIG. 3, the upper imager bank 315 may produce an output beam 331, and a lower imager 317 may produce an output beam 331. The two output beams may converge to form a stitched scan line 335. The rotated and offset arrangement of the upper imager bank 315 and the lower imager bank 317 of the imager 331 includes the upper and lower banks being separated by a 20 degree angle, for example. An output beam 331 of each upper bank 315 and lower bank 317 may intersect at a nominal image plane. In one embodiment, the 20 degree angle has been found to be a minimum required to avoid physical component interferences between imagers of the upper imager bank 315 and the lower imager bank 317. Corresponding imagers in each bank are staggered along a cross-process direction by 20 mm. The resulting architecture is called a rotated imager layout due to the included angle. Such an arrangement avoids producing two substantially separate imaging locations on an imaging plate having significant spacing there between, as would occur if the two imager banks were not rotated with respect to each other. Such spacing would result in large differences in an imaging to inking elapsed time, which is known to be a critical parameter for line edge quality of lithographic prints.

Figure 4:
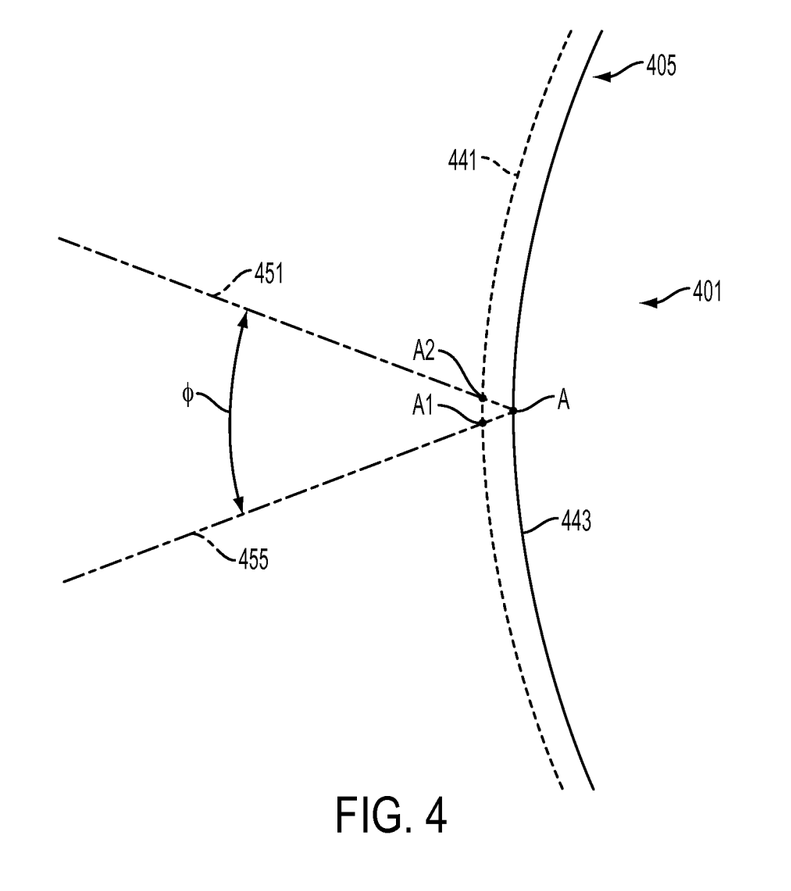
FIG. 4 shows an end schematic view along the cross-process axis of an imaging system.

FIG. 4 shows a schematic end view of an imaging cylinder. In particular, FIG. 4 shows an imaging cylinder 401 having an imaging plate 405. The imaging plate 405 is shown to include an actual plate surface 441, and an ideal plate surface 443. FIG. 4 shows an upper bank output beam 451 and a lower bank output beam 455 that are configured to nominally strike the imaging plate 405 at point A at the ideal plate surface 443. Due to geometric variations, such as imaging cylinder run out, plate thickness, imager mounting, among other issues, imaging may invariably occur at Points A1 and A2, which are spaced apart along a process direction. Thus, if a narrow line parallel to the cross-process access were being imaged, it would appear as a series of alternately off-set line segments. If such a variance was constantly measurable, then it may be compensated for by shifting image data accordingly. Because some sources of error are not constant, however, it may become difficult to compensate reliably. It has been calculated that a 100 µm image plane location error may result in a 35 µm process direction error.

Figure 5:
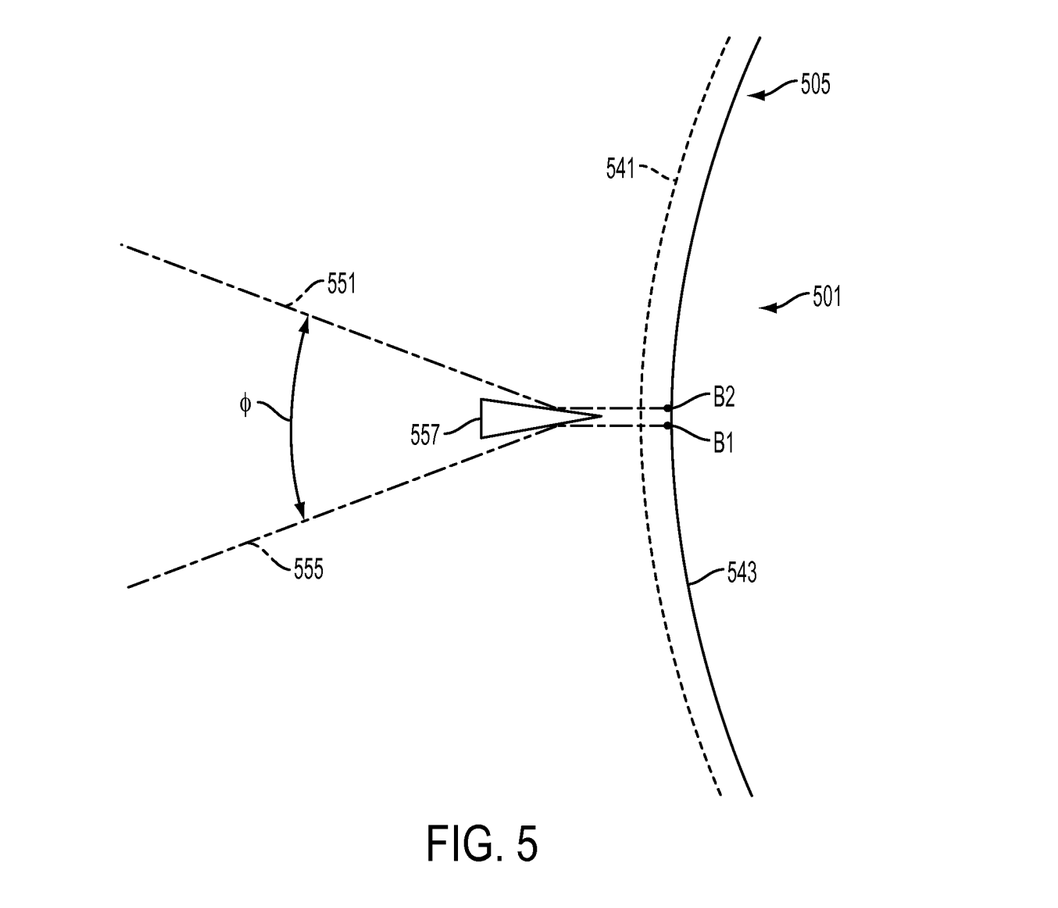
FIG. 5 shows an end schematic view along the cross-process axis of an imaging system in accordance with an embodiment.

FIG. 5 shows a schematic end view along cross-process axis of an imaging system in accordance with embodiment. Particularly, FIG. 5 shows imaging cylinder 501 having imaging plates 505. FIG. 5 shows an actual plate surface 541 or an ideal plate surface 543 of the imaging plate 505.

FIG. 5 shows an upper bank output being 551 output by an upper imager bank, and a lower bank output beam 555 output by a lower imager bank. The upper imager bank and the lower imager bank that produce the upper beam 551 and the lower beam 555, respectively, are arranged in a rotated and offset architecture as shown in, for example, FIG. 3. FIG. 5 shows a wedge mirror 557 interposing the upper and lower imager banks, and disposed in a path of the upper bank output beam 551 and the lower bank output beam 555. A first surface reflection of the upper bank output beam 551 and/or the lower bank output beam 555 is directed off of respective sides of the wedge mirror 557 to an image plane. An exact location of each imager bank may be adjusted in order to preserve a total optical path length. Reflective output beams 551 and/or 555 may be caused to extend along parallel lines, and may be caused to extend along lines that are slightly offset and/or converging to an image plane at an angle of less than 20 degrees. For configurations in which the reflected beams are caused to extend along lines that are parallel to one another, they may be offset due to a thickness of the wedge mirror. For example, if the wedge mirror is about 10 mm thick, then the output beams may have a fixed offset in the process direction of about 10 mm. This may result in a variation in an image to inking time for the upper and lower imager banks. The variation, however, may be smaller than the variation caused by related art image or architectures. At a 1 meter per second process speed, a 10 millisecond timing variation may be realized, whereas post-imager fountain solution dynamics that result in reduced image quality may occur over longer periods of time such as, for example, 100 milliseconds. If the upper output beam 551 and the lower output beam 555 are reflected off of the wedge mirror 557 so that the two beams converge, then an initial mechanism for process direction beam location error may still exist, but the error may be reduced proportionally by a reduction of the included angle. For example, if the included angle is 5 degrees, then a process direction error is reduced by a factor of 4.

In the arrangement shown in FIG. 5, both the upper bank output beam 551 and the lower bank output beam 555 are reflected off of the wedge mirror 557. FIG. 5 shows the upper bank output beam 555 being reflected off of the wedge mirror 557 to extend along a line to the ideal plate surface 543 at point B2. The lower bank output beam 555 may be output to be reflected off the wedge mirror 557 to extend along a line onto point B1 of the ideal plate surface 543. The lines along which the upper bank output beam 551 and the lower bank output beam 555 extend after being reflected by the wedge mirror 557 may be substantially parallel to one another.

Figure 6:
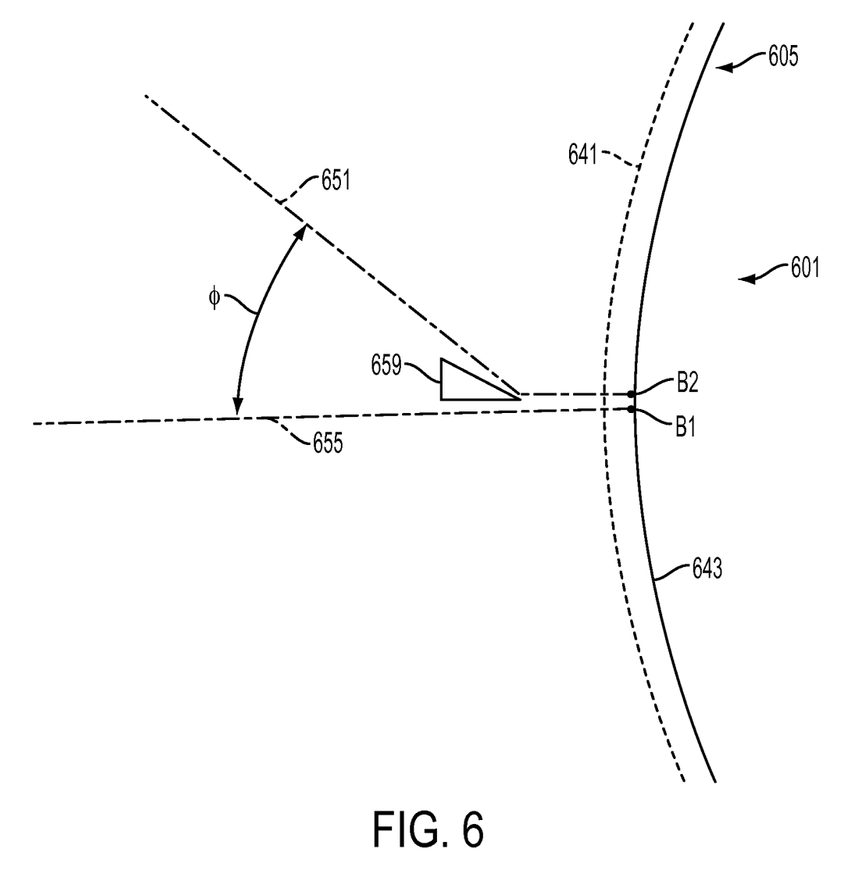
FIG. 6 shows an end schematic view along the cross-process axis of an imaging system in accordance with an embodiment.

FIG. 6 shows a schematic end view along cross-process axis of an imaging system in accordance with embodiment. Particularly, FIG. 6 shows imaging cylinder 601 having imaging plates 605. FIG. 6 shows an actual plate surface 641 or an ideal plate surface 643 of the imaging plate 605.

FIG. 6 shows an upper bank output beam 651 output by an upper imager bank, and a lower bank output beam 655 output by a lower imager bank. The upper imager bank and the lower imager bank that produce the upper beam 651 and the lower beam 655, respectively, are arranged in a rotated and offset architecture as shown in, for example, FIG. 3.

FIG. 6 shows a wedge mirror 657 interposing the upper and lower imager banks, and disposed in a path of the upper bank output beam 651 and the lower bank output beam 655. A first surface reflection of the upper bank output beam 651 and/or the lower bank output beam 655 is directed off of each side of the wedged mirror 657 to an image plane. An exact location of each imager bank may be adjusted in order to preserve a total optical pathway. Reflective output beams 651 and/or 655 may be caused to extend along parallel lines, and may be caused to extend along lines that are slightly offset and/or converging to an image plane at an angle of less than 20 degrees. For configurations in which the reflected beams are caused to extend along lines that are parallel to one another, they may be offset due to a thickness of the wedge mirror. For example, if the wedge mirror is about 10 mm thick, then the output beams may have a fixed offset in the process direction of about 10 mm. This may result in a variation in an image to inking time for the upper and lower imager banks. The variation, however, may be smaller than the variation caused by related art image or architectures. At a 1 meter per second process speed, a 10 millisecond timing variation may be realized, whereas post-imager fountain solution dynamics that result in reduced image quality may occur over longer periods of time such as, for example, 100 milliseconds.

If the upper output beam 651 and the lower output beam 655 are reflected off of the wedge mirror 657 so that the two beams converge, then an initial mechanism for process direction beam location error may still exist, but the error may be reduced proportionally by a reduction of the included angle. For example, if the included angle is 5 degrees, then a process direction error is reduced by a factor of 4.

FIG. 6 shows an upper bank output beam 651 being reflected off of a wedge mirror 659. The wedge mirror 659 is a one-sided wedge mirror. FIG. 6 shows the lower bank output beam 655 being output directly onto the ideal plate surface 643 at point B1. The upper bank output beam 651 is output along a line that converges with the lower bank output beam, and after being reflected by the one-sided wedge mirror 659, the output beam 651 extends along a line that is parallel to the lower bank output beam 655, and onto the ideal plate surface 643 at point B2.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An imager apparatus useful for a digital architecture lithographic printing system, the printing system having an imaging plate, the apparatus comprising:
    a first imager bank having at least one imager configured to produce a first output beam;
    a second imager bank having at least one imager configured to produce a second output beam, the second bank being oriented at a first angle with respect to the first bank, the first output beam and the second output beam each having a cross-process width, the first and second imager banks having a physical width greater than the cross-process width, the second imager bank rotated and offset from the first imager bank in an arrangement separated by at least a 20 degree angle to avoid physical interference between the at least one imager of the first imager bank and the at least one imager of the second imager bank, the first output beam and the second output beam being at the first angle relative to each other where they exit the first imager bank and the second imager bank; and
    a wedge mirror, the wedge mirror being configured to reflect at an obtuse angle at least one of the first output beam and the second output beam toward the imaging plate,
    wherein the first output beam and the second output beam extend along converging lines at the first angle to the wedge mirror, and extend along separate lines at a second angle from the wedge mirror to the imaging plate, and
    wherein the second angle is smaller than the first angle.

2. The apparatus of claim 1, wherein the first output beam and the second output beam are substantially parallel at the imaging plate.

3. The apparatus of claim 1, wherein the cross-process width is greater than 20 mm.

4. The apparatus of claim 1, wherein the first output beam and the second output beam extend along separate parallel lines at a second point, the second point interposing the wedge mirror and the imaging plate.

5. The apparatus of claim 1, wherein the first imager bank has a plurality of imagers configured to output a first set of parallel beams.

6. The system of claim 5, wherein the second imager bank has a plurality of imagers configured to output a second set of parallel beams.

7. The system of claim 1, wherein the at least one imager of the first imager bank is a high power infra red laser line generator.

8. The system of claim 1, wherein the beam constitutes at least a component of a scanline.

9. The system of claim 1, wherein the at least one of the first output beam and the second output beam reflected from the wedge mirror extends directly to the imaging plate.

10. The system of claim 9, wherein the first output beam and the second output beam extending directly from the wedge mirror to the imaging plate converge at the second angle, with the first angle being at least 20 degrees convergence to the wedge mirror and the second angle being less than 20 degrees convergence and greater than 0 degrees convergence.

11. An imager system for digital architecture lithographic printing, comprising:
   an imaging member having an imaging plate;
   a first imager bank having at least one imager configured to produce a first output beam; and
   a second imager bank having at least one imager configured to produce a second output beam, the second bank being oriented at a first angle with respect to the first bank, the first output beam and the second output beam each having a cross-process width, the first and second imager bank having a physical width greater than the cross-process width, the second imager bank rotated and offset from the first imager bank in an arrangement separated by at least a 20 degree angle to avoid physical interference between the at least one imager of the first imager bank and the at least one imager of the second imager bank, the first output beam and the second output beam being at the first angle relative to each other where they exit the first imager bank and the second imager bank; and
   a wedge mirror, the wedge mirror being configured to reflect at an obtuse angle at least one of the first output beam and the second output beam toward the imaging plate,
   wherein the first output beam and the second output beam extend along converging lines at the first angle to the wedge mirror, and extend along separate lines at a second angle from the wedge mirror to the imaging plate, and
   wherein the second angle is smaller than the first angle.

12. The apparatus of claim 11, wherein the first output beam and the second output beam are substantially parallel at the imaging plate.

13. The apparatus of claim 11, wherein the cross-process width is greater than 20 mm.

14. The apparatus of claim 11, wherein the first output beam and the second output beam extend along separate parallel lines at a second point, the second point interposing the wedge mirror and the imaging plate.

15. The system of claim 11, wherein the first imager bank has a plurality of imagers configured to output a first set of parallel beams.

16. The system of claim 15, wherein the second imager bank has a plurality of imagers configured to output a second set of parallel beams.

17. The system of claim 11, wherein the at least one imager of the first imager bank is a high power infra red laser line generator.

18. The system of claim 11, wherein the beam constitutes at least a component of a scanline.

19. The system of claim 11, wherein the at least one of the first output beam and the second output beam reflected from the wedge mirror extends directly to the imaging plate.

20. The system of claim 19, wherein the first output beam and the second output beam extending directly from the wedge mirror to the imaging plate converge at the second angle, with the first angle being at least 20 degrees convergence to the wedge mirror and the second angle being less than 20 degrees convergence and greater than 0 degrees convergence.

* * * * *